United States Patent [19]

Tamura et al.

[11] Patent Number: 5,339,011
[45] Date of Patent: Aug. 16, 1994

[54] DISPLAY DEVICE

[75] Inventors: Takahiko Tamura, Tokyo; Satoshi Miura, Kanagawa, both of Japan

[73] Assignee: Sony Corporation, Tokyo, Japan

[21] Appl. No.: 10,776

[22] Filed: Jan. 29, 1993

[30] Foreign Application Priority Data

Feb. 18, 1992 [JP] Japan .................. 4-061009

[51] Int. Cl.$^5$ .............. G09G 1/04; H01J 1/04; H04N 5/18
[52] U.S. Cl. .................. 315/383; 315/367; 348/695
[58] Field of Search ........... 315/383, 367; 358/172

[56] References Cited

U.S. PATENT DOCUMENTS

| | | | |
|---|---|---|---|
| 4,698,557 | 10/1987 | Harlos | 315/383 |
| 4,724,364 | 2/1988 | Newton | 315/383 |
| 4,811,101 | 3/1989 | Yagi | 358/172 |

FOREIGN PATENT DOCUMENTS

| | | | |
|---|---|---|---|
| 61-294980A | 12/1986 | Japan | H04N 5/68 |
| 64-58178A | 3/1989 | Japan | H04N 5/57 |
| 0391374A | 4/1991 | Japan | H04N 5/14 |

*Primary Examiner*—Gregory C. Issing
*Attorney, Agent, or Firm*—Lewis H. Eslinger; Jay H. Maioli

[57] ABSTRACT

A display device comprising a CRT having a reduced number of components for automatic cutoff adjustment. The device needs an IC having a less number of connection pins. The device adds reference pulses to given portions within every field of video signals. The resulting cathode currents are converted into voltage pulses. These voltage pulses are compared with a reference voltage by a comparator. The output signal from this comparator is counted by forward-backward counters for three primary colors, respectively, and converted into analog form. Level shift circuits for the three primary colors, respectively, control the DC components of the video signals according to the output signals from the D/A converters. In this way, the cutoff characteristics of the CRT are controlled.

3 Claims, 16 Drawing Sheets

DISPLAY DEVICE

FIELD OF THE INVENTION

The present invention relates to a display device used in a television receiver, monitor device, or the like and, more particularly, to a display device comprising a CRT whose cutoff characteristics can be controlled automatically.

BACKGROUND OF THE INVENTION

As is well known in the art, in a display device used in a television receiver or the like, R, G, and B phosphors are arranged regularly in a CRT (cathode-ray tube). These phosphors are activated by beams from a red gun, a green gun, and a blue gun, respectively, according to red, green, and blue video signals, respectively. Thus, the phosphors emit light of different colors to provide a display of a picture.

CRTs including electron guns vary widely among manufactured products. Also, red, green, and blue phosphors do not have uniform characteristics. The cutoff point at which a phosphor begins to emit differs among the three kinds of phosphors.

The cutoff characteristic, or the luminescent characteristic, is represented in terms of the ratio of the cathode current to the cathode voltage, and is shown in FIG. 15. As can be seen from this graph, the phosphors emitting red (R), green (G), and blue (B), respectively, differ in cutoff characteristic. It is to be noted that FIG. 15 merely shows one example. It is not always the case that the cutoff points lie in the order of red, green, and blue in order of lowering cathode voltage. The cutoff characteristic is quite nonuniform among CRTs.

During manufacture of CRTs, adjustments are needed to bring the cutoff points into agreement. In particular, a level shift circuit, a gain control circuit, and other circuits are included in a signal processing-/amplifier network for each of the three primary colors. These level shift circuit and gain control circuit are adjusted to bring the cutoff characteristics of all the phosphors into agreement.

An automatic cutoff adjustment method of automatically adjusting the cutoff points has been proposed to eliminate such cutoff adjustment steps and gain control circuits. FIG. 16 is a block diagram of main portions of a television receiver utilizing the conventional automatic cutoff adjustment. After supplied video signals are demodulated into red, green, and blue signals by demodulator circuits (not shown), these three signals are fed to switch circuits 1R, 1G, and 1B, respectively. In the switch circuits 1R, 1G, and 1B, reference pulses $RP_R$, $RP_G$, and $RP_B$ are added to different portions within the vertical retrace interval of each signal as shown in FIG. 17.

The signals to which the reference pulses $RP_R$, $RP_G$, and $RP_B$ are added are supplied to driver circuits 3R, 3G, and 3B, respectively, via the level shift circuits 2R, 2G, and 2B, respectively. Of course, a picture is displayed according to the camera signal components of the signals supplied to the driver circuits 3R, 3G, and 3B. The internal configurations of driver circuits 3G and 3B are not shown, since they are the same as the internal configuration of the driver circuit 3R. The CRT is indicated by numeral 4.

The reference pulses $RP_R$, $RP_G$, and $RP_B$ added within the vertical retrace interval are now discussed. Similarly to the camera signal portions, these reference pulses are amplified by their respective transistors $Q_1$, giving rise to cathode currents $R_{IK}$, $G_{IK}$, and $B_{IK}$ for the CRT. These cathode currents $R_{IK}$, $G_{IK}$, and $B_{IK}$ are detected by their respective transistors $P_1$ and supplied to a resistor $R_1$ via switch circuits 5R, 5G, and 5B, respectively. These switch circuits 5R, 5G, and 5B are so controlled that their contacts are closed only during periods corresponding to the reference pulses $RP_R$, $RP_G$, and $RP_B$. As a result, three voltage pulses as shown in FIG. 18 are obtained by the resistor $R_1$, the pulses corresponding to the cathode currents produced in response to the reference pulses $RP_R$, $RP_G$, and $RP_B$ for the three primary colors.

These voltage pulses are applied to a clamping circuit 6 via a clamping capacitor $C_1$. This capacitor $C_1$ is electrically charged and discharged such that the clamped portion of the voltage produced from the clamping pulse-generating portion 6a is $V_1$ (FIG. 18). The clamped pulse voltages are successively distributed to their respective comparators 8R, 8G, and 8B for the three primary colors, respectively, by a switch circuit 7. A voltage higher than the voltage $V_1$ by $\Delta V_1$ is applied as a reference voltage to the other terminals of the comparators 8R, 8G, and 8B. The voltage pulses whose DC levels are clamped at $V_1$ are compared with this voltage $(V_1 + \Delta V_1)$.

The comparators 8R, 8G, and 8B are so controlled that they compare their respective one input signals with the reference voltage only while the voltage pulses are being supplied. Each comparator can take the form a differential amplifier producing an output signal containing errors included in the voltage pulses and the reference voltage. The output signals $\Delta V_1$ ($=\Delta V_1'$) from the comparators 8R, 8G, and 8B are supplied to sample-and-hold capacitors $C_{2R}$, $C_{2G}$, and $C_{2B}$, respectively. The voltages held by the sample-and-hold capacitors $C_{2R}$, $C_{2G}$, and $C_{2B}$ are supplied as control voltages to the level shift circuits 2R, 2G, and 2B, respectively.

That is, the level shift circuits 2R, 2G, and 2B are controlled by the voltages held by the sample-and-hold capacitors $C_{2R}$, $C_{2G}$, and $C_{2B}$ in such a way that the black levels of the red, green, and blue signals become equal to the heights of the reference pulses $RP_R$, $RP_G$, and $RP_B$, respectively. In this way, automatic cutoff adjustment is accomplished.

The conventional automatic cutoff adjustment circuit constructed as described above has the following problems. A portion 10 surrounded by the dot-and-dash line in FIG. 16 is normally composed of one IC. The sample-and-hold capacitors $C_{2R}$, $C_{2G}$, and $C_{2B}$ must be attached to the outside of the IC. This increases the number of components. Also, three extra connection pins of the IC are used, thus increasing the cost. Furthermore, the efficiency of the manufacturing steps is deteriorated.

In addition, an electrical current flows through each of the pins to which the sample-and-hold capacitors $C_{2R}$, $C_{2G}$, and $C_{2B}$ are connected only during the period of the reference pulse (1H) within one field. Consequently, the impedance is very high. However, if the substrate ages and its impedance drops, a leakage current is produced. As a result, the operation of the sample-and-hold capacitors $C_{2R}$, $C_{2G}$, and $C_{2B}$ is no longer maintained normal.

SUMMARY OF THE INVENTION

It is an object of the present invention to provide a display device comprising a CRT free of the foregoing drawbacks.

This object is achieved by a display device which adds reference pulses to given portions within each field of video signals, converts cathode currents derived according to the reference pulses into voltage pulses, and obtains information about control of the cutoff characteristics of the CRT from the output signals from comparator means that compare the voltage pulses with a given reference voltage. This display device is characterized in that it controls the cutoff characteristics by forward-backward counter means counting the output signals from the comparator means, D/A converter means converting the output signals from the D/A converter means into analog form, and level shift means controlling the DC components of the video signals according to the output voltages from the D/A converter means.

When the CRT is under stable condition, the forward-backward counter means are switched between forward counting and backward counting between successive fields. In this state, the reference voltage compared with the input voltage pulses applied to the comparator means in every field is switched between a first level and a second level between successive fields. In this way, the reference voltage oscillates between the two levels.

The variations in the least significant bits of the output signals from the D/A converter means are superimposed with reverse polarity on the output signals from the D/A converter means only during periods corresponding to the camera signal component within each field of the video signals.

The difference between the voltage pulse converted from the cathode current in response to one reference pulse per field and the given reference voltage is counted forward. The total count obtained is converted into analog form. This analog signal is held for one field. That is, information regarding control over the level shift means can be obtained without using sample-and-hold capacitors.

During the stable period of the level shift means, the least significant bits of the output signals from the forward-backward counters are incremented during one field and then decremented during the next field, and so on. During this period, the reference voltage supplied to the comparator means is switched between the first and second levels back and forth to prevent the comparator means from malfunctioning.

During the stable period for which the least significant bits are incremented and decremented repeatedly, if the level of the camera signal component is shifted according to the output signals from the forward-backward counter means, then the brightness will vary from field to field. The variations in the least significant bits is imparted with opposite polarity to the camera signal components. This clamps the black level during the intervals of the camera signal components, thus preventing the visible image from flickering.

Other objects and features of the invention will appear in the course of the description thereof which follows.

DETAILED DESCRIPTION OF THE INVENTION

Figure 17:
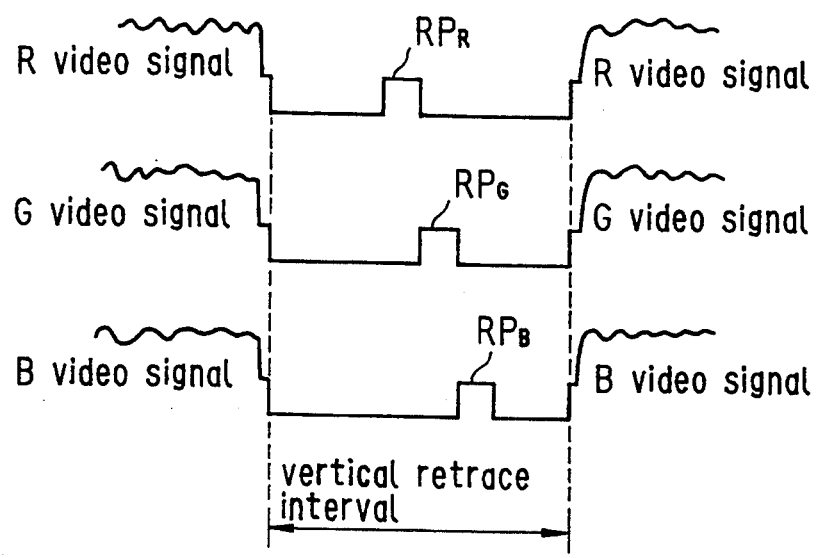
FIG. 17 is a waveform diagram of reference pulses added by the prior art display device shown in FIG. 16.

A display device according to the invention is now described. This device performs (A) an automatic cutoff adjustment operation, (B) a swinging reference voltage supply operation, (C) an operation for superimposing signals of opposite polarity on the output signals from D/A converters, (D) a color-temperature adjustment operation outside the automatic cutoff loop, and (E) an operation for quickly stabilizing the cutoff operation, using counter pulses. These operations are described successively below by referring to FIGS. 1–14 and, also to FIGS. 17 and 18 which have been already used.

(A) Automatic Cutoff Adjustment

Figure 1:
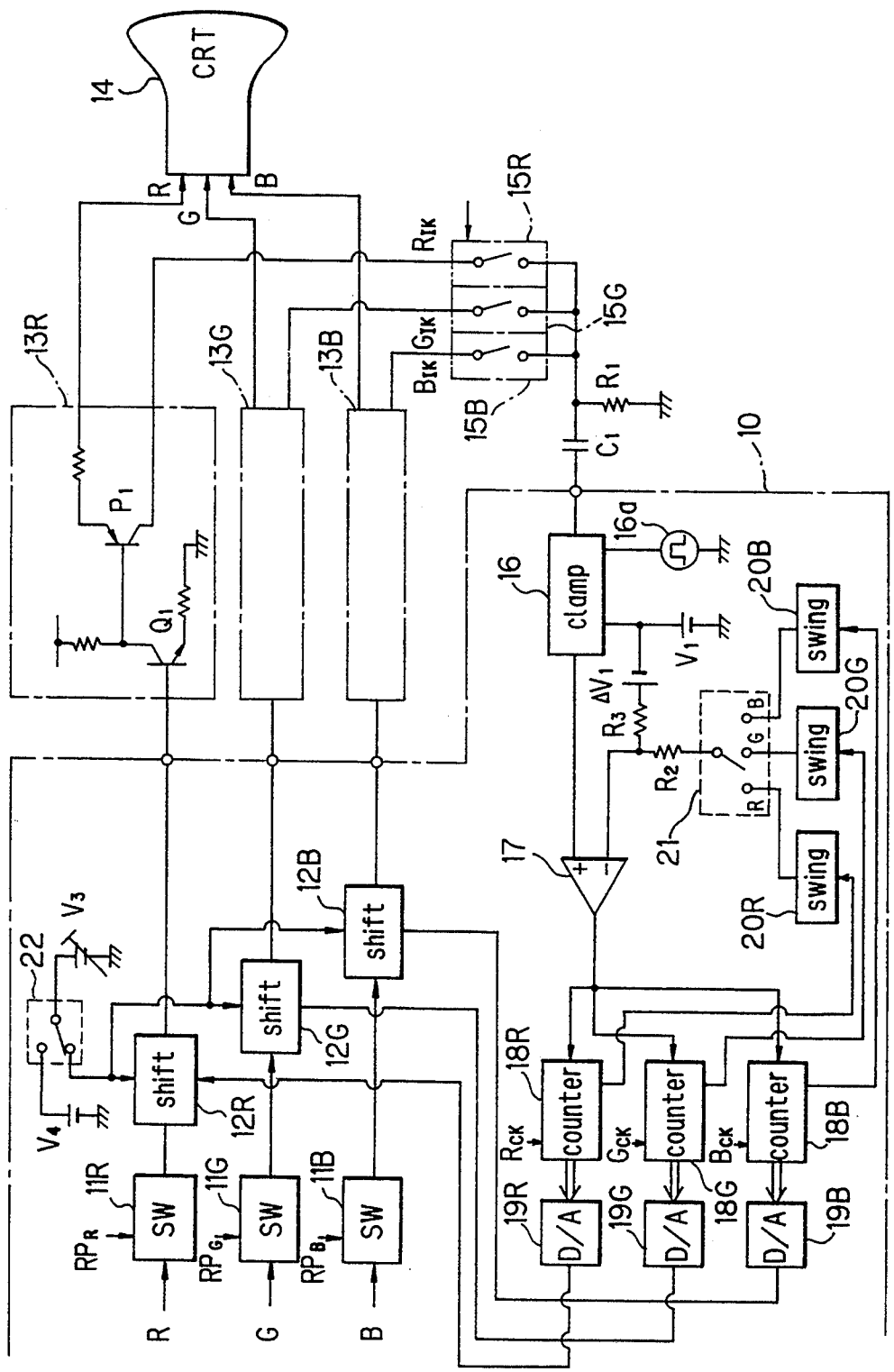
FIG. 1 is a block diagram of main portions of a display device according to the invention.

FIG. 1 is a block diagram of main portions of a television receiver embodying the display device according to the invention. This receiver has switch circuits 11R, 11G, and 11B which add reference pulses $RP_R$, $RP_G$, and $RP_B$ as already described in conjunction with FIG. 17 to given different portions within the vertical retrace periods of demodulated red, green, and blue signals. Level shift circuits 12R, 12G, and 12B control the black levels of video signals as described later to adjust the cutoff characteristics of the phosphors emitting red, green, and blue colors. The output signals from the level shift circuits 12R, 12G, and 12B are supplied to driver circuits 13R, 13G, and 13B, respectively, and amplified by their respective transistors $Q_1$ to drive the red, green, and blue guns of the CRT 14. Cathode currents $R_{IK}$, $G_{IK}$, and $B_{IK}$ are detected by their respective transistors $P_1$.

Figure 18:
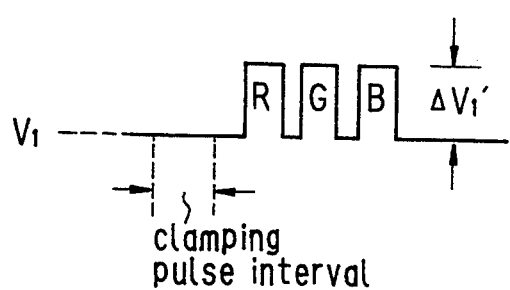
FIG. 18 is a waveform diagram of voltage pulses produced in response to cathode currents which, in turn, are produced in response to the reference pulses shown in FIG. 17.

The cathode currents $R_{IK}$, $G_{IK}$, and $B_{IK}$ flow into a resistor $R_1$ via switch circuits 15R, 15G, and 15B, respectively. The switch circuits 15R, 15G, and 15B are so controlled that their contacts are closed only during the periods corresponding to the reference pulses $RP_R$, $RP_G$, and $RP_B$. Therefore, as shown in FIG. 18, three voltage pulses corresponding to the cathode currents are obtained by a resistor $R_1$, the cathode currents being produced in response to the reference pulses $RP_R$, $RP_G$, and $RP_B$, respectively, for the three primary colors.

These voltage pulses are applied to a clamping circuit 16 via a clamping capacitor $C_1$. This capacitor $C_1$ is electrically charged and discharged such that the clamped portion of the voltage produced from the clamping pulse-generating portion 6a is $V_1$ (FIG. 18). The clamped voltage pulses as shown in FIG. 2(a) are supplied to a comparator 17. A voltage higher than the voltage $V_1$ by $\Delta V_1$ is applied as a reference voltage to the other terminal of the comparator 17. Each voltage pulse whose DC level is clamped at $V_1$ is compared with this reference voltage. As a result, the comparator 17 produces a high output signal (5 V) or a low output signal (0 V), as shown in FIG. 2(b).

Figure 2:
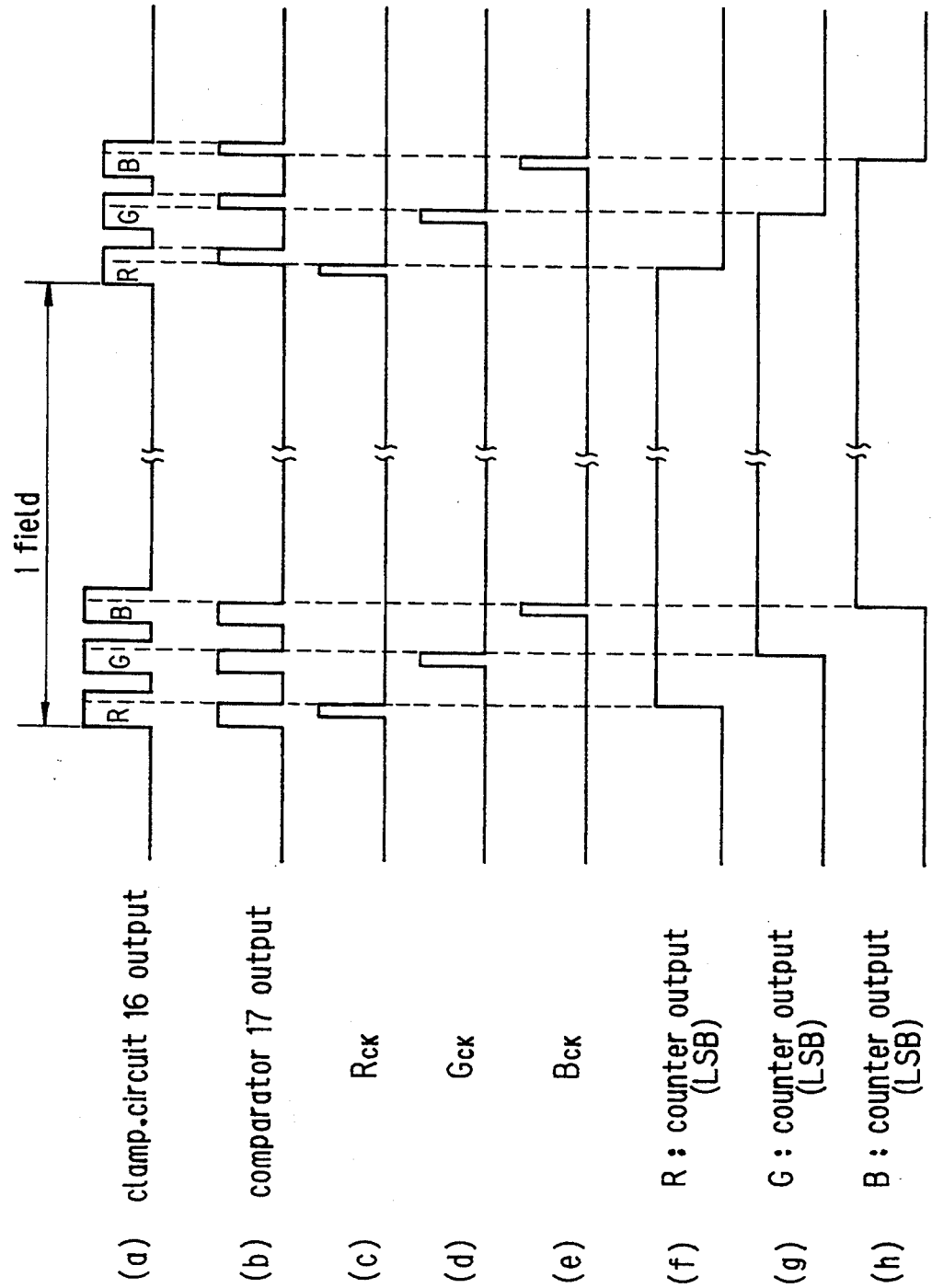
FIGS. 2a–2h is a timing chart illustrating counting operations performed in response to reference pulses produced in the display device shown in FIG. 1.

The output signal from the comparator 17 is supplied to forward-backward counter portions (or reversible counter portions) 18R, 18G, and 18B, which also receive count clocks $R_{CK}$, $G_{CK}$, and $B_{CK}$ during periods corresponding to the reference pulses for the three primary colors, as shown in FIG. 2, (c)–(e). Thus, if the output from the comparator 17 is high, the counter portions count forward. If the output from the comparator 17 is low, the counter portions count backward. FIG. 2, (f)–(h), show only the least significant bits of the output signals from the counter portions. The output signals from the forward-backward counter portions 18R, 18G, and 18B are converted into analog form by D/A converters 19R, 19G, and 19B, respectively.

Figure 3:
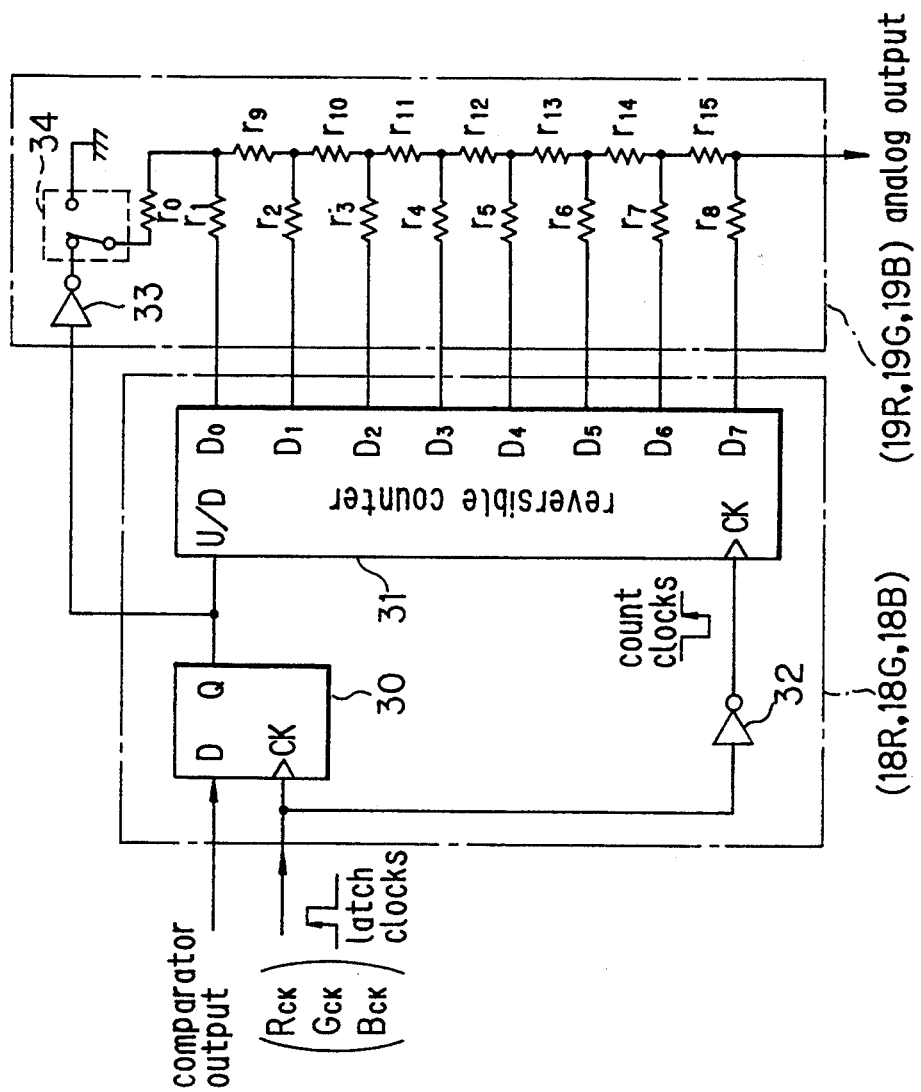
FIG. 3 is a circuit diagram of the forward-backward counter portion and the D/A converter portion of the display device shown in FIG. 1.
Figure 4:
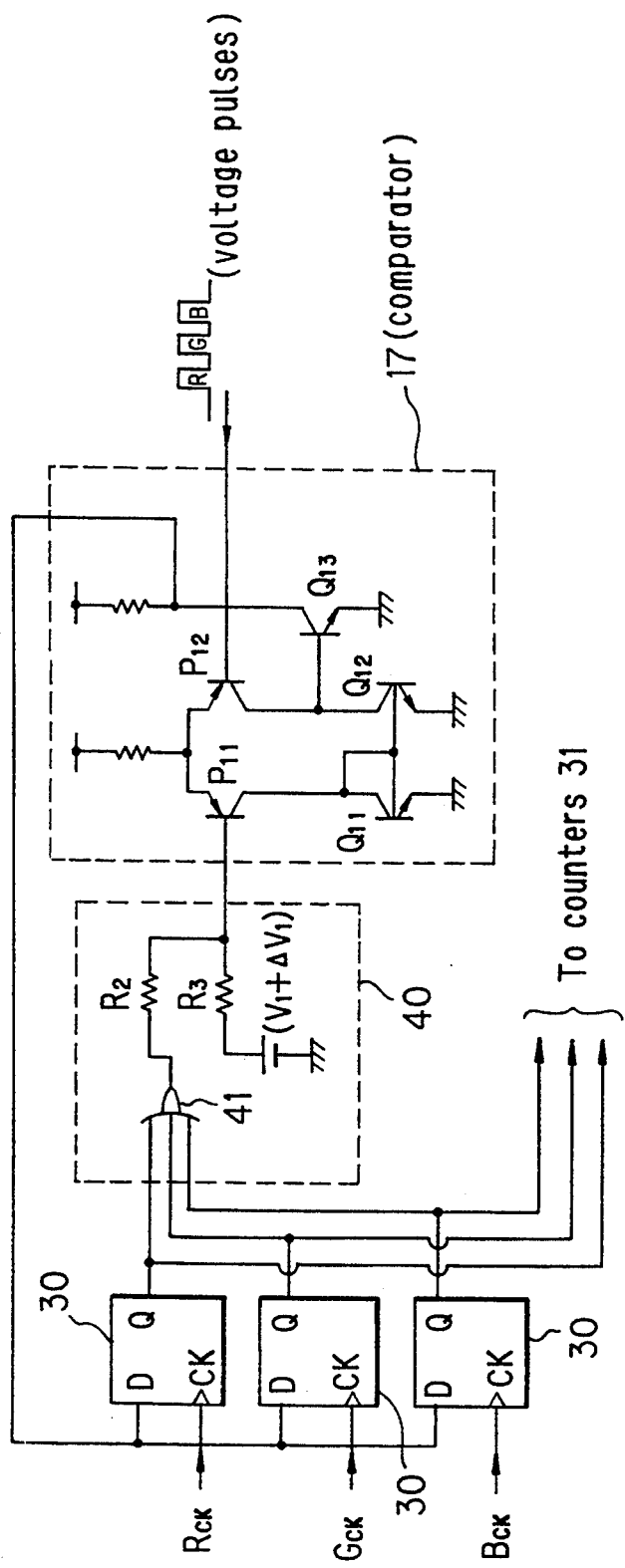
FIG. 4 is a circuit diagram of one swinging voltage-generating portion of the display device shown in FIG. 1.

The structures of the forward-backward counter portions 18R, 18G, and 18B and the structures of the D/A converter portions 19R, 19G, and 19B are next described in detail by referring to FIG. 3. The output signal from the comparator 17 is applied to the data terminals of D flip-flops 30. The count clocks $R_{CK}$, $G_{CK}$, and $B_{CK}$ are used as latch clocks. The output signals from the comparator means are latched in the D flip-flops. The latched outputs from these D flip-flops are supplied to their respective forward-backward counters (or bidirectional counters) 31. Since the latched outputs are counted in this way, the effect of the distortion of the output waveform from the comparator 17 can be removed.

In practice, in this case, the count clocks $R_{CK}$, $G_{CK}$, and $B_{CK}$ are supplied to the forward-backward counters, or reversible counters, 31 via an inverter 32. The latched output is counted at the leading edge of the output from the inverter 32. Each forward-backward counter 31 performs an 8-bit counting operation. The total count obtained is converted into an analog voltage by a D/A converter consisting of resistors $r_0$–$r_{15}$. An inverter 33 and a switch circuit 34 will be described later.

In this way, the output signal from the comparator 17 is counted forward or backward, depending on the state of the output signal from the forward-backward counters. The output signals from these forward-backward counters are converted into analog voltages by the D/A converters. That is, the output signals from the D/A converters 19R, 19G, and 19B for the red, green, and blue colors are supplied as control voltages to the level shift circuits 12R, 12G, and 12B, respectively. That is, the level shift circuits 12R, 12G, and 12B are so controlled that the black levels of the red, green, and blue signals become equal to the heights of the reference pulses $RP_R$, $RP_G$, and $R_{PB}$, respectively (i.e., the voltage $\Delta V_1'$ becomes equal to $\Delta V_1$). In this manner, automatic cutoff adjustment is accomplished.

Accordingly, the forward-backward counters 31 keep counting forward or downward during early fields. However, after a given instant of time, the counters are switched between forward counting and backward counting between successive fields. That is, the forward counting operation and the backward counting operation are alternately repeated, whereby the operation is settled. Hence, the automatic cutoff adjustment operation is stabilized.

Figure 16:
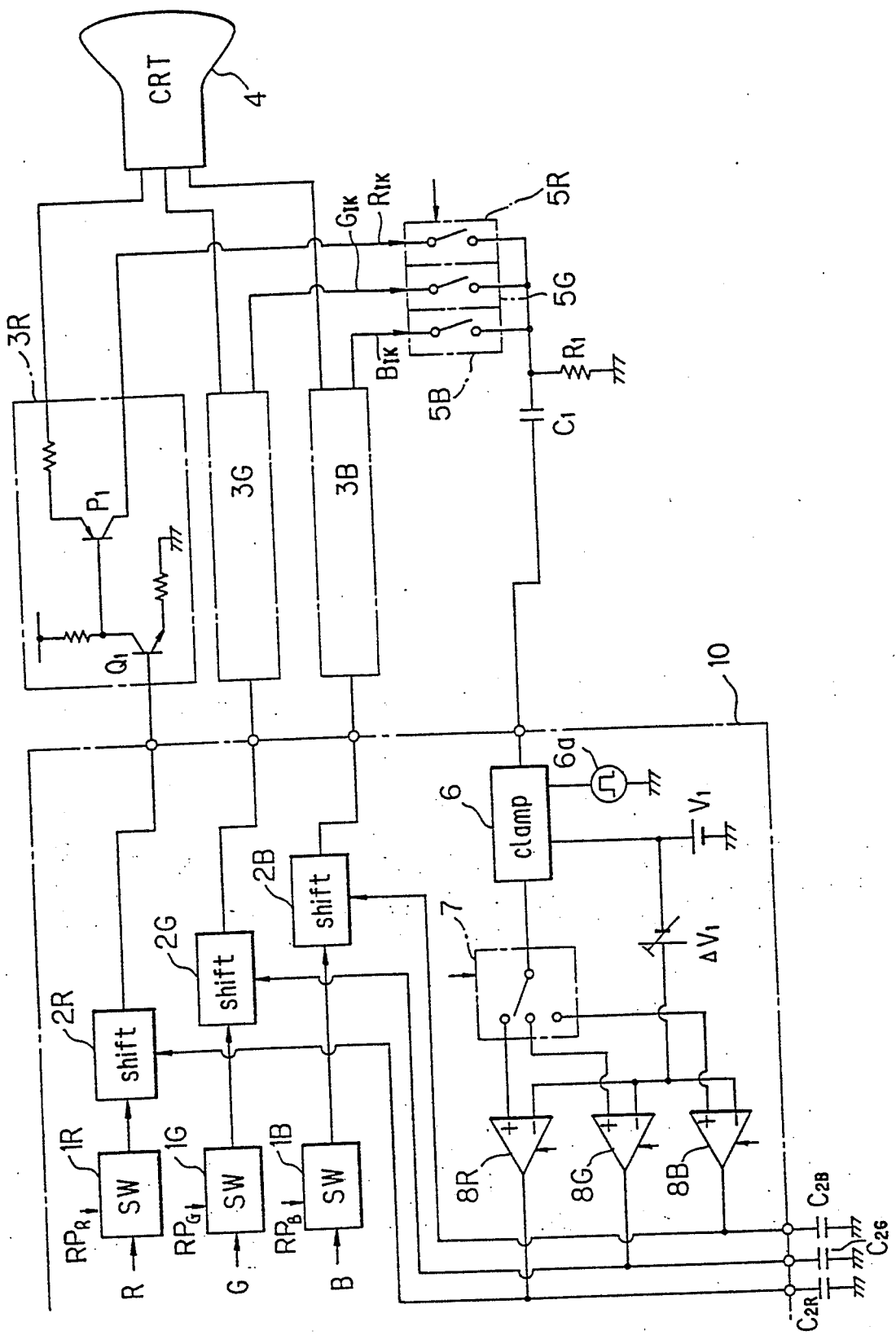
FIG. 16 is a block diagram of the automatic cutoff adjustment portion of the prior art display device.

In the present embodiment, the portion 10 surrounded by the dot-and-dash line can be composed of one IC and so externally attached, conventional sample-and-hold capacitors as described in connection with FIG. 16 used to realize automatic cutoff adjustment operation are dispensed with.

Consequently, in the present embodiment, the number of the pins of the IC can be reduced. Also, some devices can be omitted. In consequence, the cost can be curtailed. Furthermore, the efficiency of the manufacturing steps can be improved. Of course, the automatic cutoff adjustment operation does not become unstable even if the substrate ages and the externally attached sample-and-hold capacitors cease to operate normally.

(B) Supply of Swinging Reference Voltage

When the automatic cutoff adjustment operation is stable, it can be said that the forward counting operation and the downward counting operation must be correctly repeated by the forward-backward counters 31. For this purpose, the output signal from the comparator 17 must be switched between low state and high state back and forth between successive fields in relation to the reference pulses $RP_R$, $RP_G$, and $RP_B$ for the red, green, and blue signals, respectively, or in relation to the voltage pulses corresponding to the cathode currents detected in response to the reference pulses.

In stable condition, however, the voltage pulses produced during each field considerably approximate the reference voltage, and their differences are not sufficiently large. Therefore, the comparison operation performed by the comparator 17 tends to malfunction by the effect of noise, for example. Since the probability of occurrence of this malfunction is at random, the white balance is momentarily lost. The result is that flickering colors appear on the phosphor screen.

Accordingly, in the present embodiment, swinging voltage circuits 20R, 20G, 20B, and a switch circuit 21 are provided to control the reference voltage ($V_1+\Delta V_1$) applied to the comparator 17. The swinging voltage circuits 20R, 20G, 20B, and the switch circuit 21 are collectively indicated by 40 in FIG. 4. In practice, this portion 40 can be composed of an OR gate 41, a resistor $R_2$, the power supply portion for the reference voltage ($V_1+\Delta V_1$), and a resistor $R_3$. The D flip-flops disposed before the OR gate 41 are the D flip-flops 30 of the forward-backward counter portions 18R, 18G, and 18B shown in FIG. 3.

The comparator 17 has a differential pair of transistors $P_{11}$ and $P_{12}$ which compares the reference voltage ($V_1+\Delta V_1$) supplied to the base of the transistor $P_{11}$ with voltage pulses supplied to the base of the transistor $P_{12}$. The output signal from the comparator 17 is taken from the collector of a transistor $Q_{13}$. This output signal is supplied to the D flip-flops 30 of the forward-backward counter portions 18R, 18G, and 18B, and latched in response to the latch clocks $R_{CK}$, $G_{CK}$, and $B_{CK}$ supplied only during the periods of the reference pulses. The latched output signals of 5 or 0 V from the D flip-flops 30 are supplied to the forward-backward counters 31 as shown in FIG. 3 and also to the OR gate 41. The output signals are added to the original reference voltage ($V_1+\Delta V_1$) according to the ratio of the resistance of the resistor $R_2$ to the resistance of the resistor $R_3$.

Figure 5:
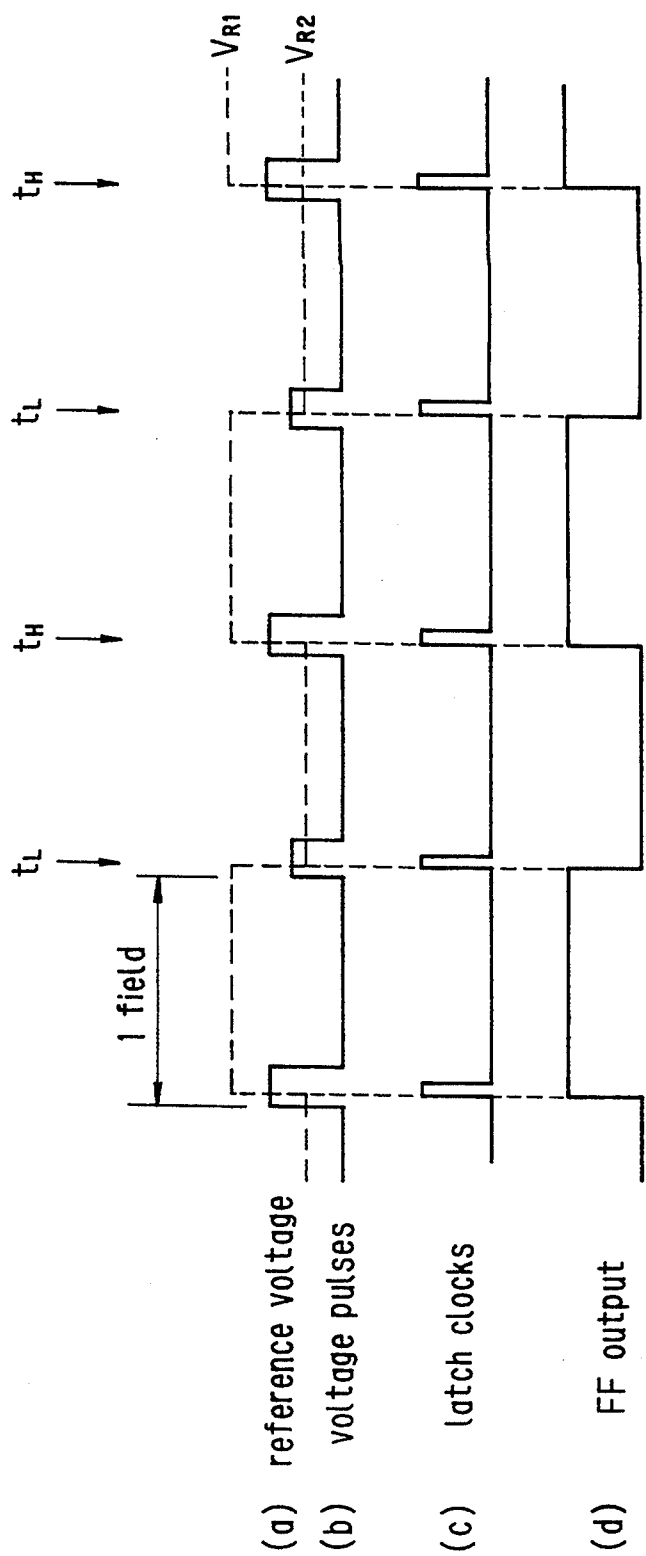
FIGS. 5a–5d is a waveform diagram illustrating the swinging reference voltage produced in the display device shown in FIG. 1.

As indicated by the broken line in FIG. 5(a), after the latched output signals from the D flip-flops 30 have assumed a high state, the reference voltage assumes a relatively high first voltage $V_{R1}$. After the latched output signals from the D flip-flops 30 have assumed a high state, the reference voltage takes a relatively low second voltage $V_{R2}$. FIG. 5, (b), (c), and (d), show voltage pulses supplied to the comparator 17, the latch clocks, and the output signals from the D flip-flops, respectively. For the sake of simplicity, only the waveforms for one color are shown. In practice, however, the reference voltage shown in FIG. 5(a) takes a waveform that is a composite of waveforms for the three primary colors.

When the comparator 17 should produce a low output signal at instant $t_L$, the reference voltage becomes equal to $V_{R1}$. When the comparator 17 should produce a high output signal at instant $t_H$, the reference voltage becomes equal to $V_{R2}$. In stable condition, i.e., when the voltage pulses approach the reference voltage, the comparator output should be switched between a high state and a low state between successive fields. In this state, the comparison operation is insusceptible to noise and performed stably.

(C) Superimposition of Signals of Opposite Polarity on D/A Converter Output

In the present embodiment, when the automatic cutoff loop is in stable condition in this way, the least significant bit of each forward-backward counter 31 for each of the three primary colors is switched to low or high state between successive fields. This means that under stable condition, the levels are shifted by amounts corresponding to the variations in the least significant bits (i.e., the variations in the voltage values of the least significant bits of the D/A converters 19R, 19G, and 19B) by the level shift circuits 12R, 12G, and 12B. The black levels of the video signals are swung up or down accordingly between successive fields. Furthermore, the same state occurs for all of the three primary colors and, therefore, the brightness on the phosphor screen flickers.

Accordingly, in the present embodiment, in order to prevent the brightness from flickering, the variations in the voltages corresponding to the least significant bits of the D/A converters 19R, 19G, and 19B are superimposed with opposite polarity on the output signals from the D/A converters 19R, 19G, and 19B, respectively. This is described in further detail by referring to FIGS. 3 and 6.

Figure 6:
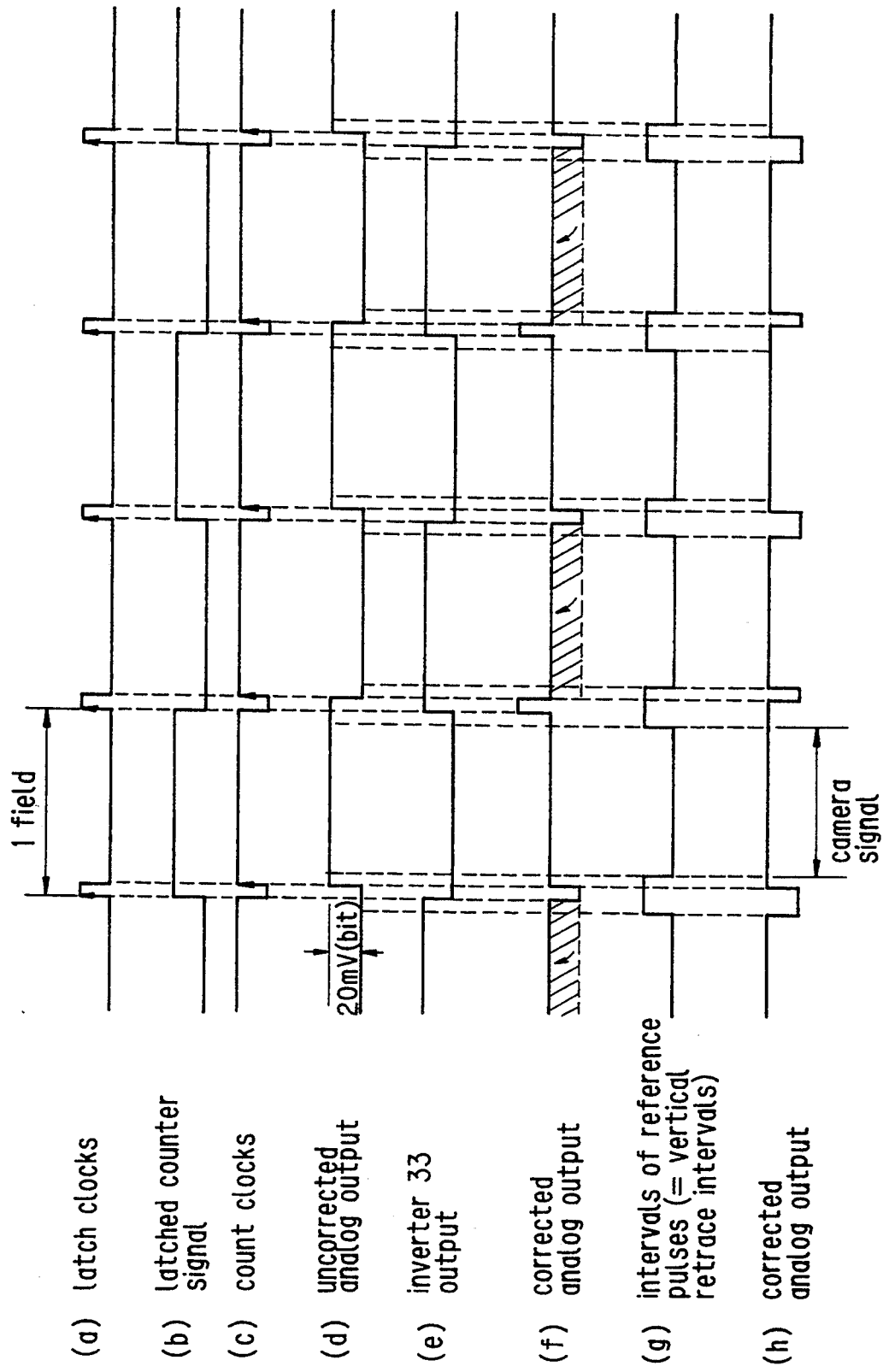
FIGS. 6a–6h is a waveform diagram illustrating operations performed to correct the output signals from the D/A converters of the display device shown in FIG. 1.
Figure 7:
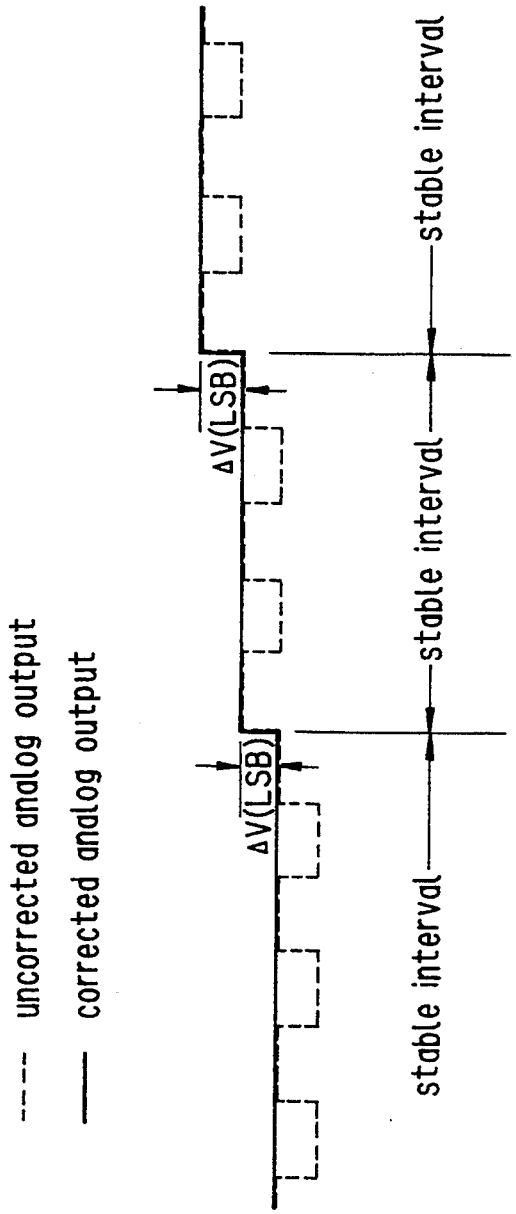
FIG. 7 is a diagram illustrating the output signals from the D/A converters of the display device shown in FIG. 1.

As mentioned above, the output signals from the comparator 17 for the three primary colors are latched in the D flip-flops 30, respectively, in response to the latch clocks $R_{CK}$, $G_{CK}$, and $B_{CK}$ (and in response to the count clocks supplied via the inverter 32), and counted by the forward-backward counters 31. The states are shown in FIG. 6, (a)–(c). The counters 31 count forward or backward when the output from the comparator is high or low, respectively. The output signals from the forward-backward counters 31 are sent to the D/A converters 19R, 19G, and 19B each consisting of the resistors $r_0$–$r_{15}$. Normally, the aforementioned switch circuit 34 is connected with a grounding terminal and so the resistor $r_0$ is grounded. Under this condition, the output signals from the D/A converters 19R, 19G, and 19B corresponding to the least significant bits take the form shown in FIG. 6(d). The output signals from the D/A converters control the amounts of shifts made by the level shift circuits 12R, 12G, and 12B.

If the contact of the switch circuit 34 is switched to the aforementioned inverter 33 to pass the signal of FIG. 6(b) through the inverter 33 and supply the inverted signal (FIG. 6(e)) to the resistor $r_0$, then the output signals from the D/A converters 19R, 19G, and 19B assume the form shown in FIG. 6(f). That is, the low-level portions of FIG. 6(d) (indicated by hatching) of the camera signal components are compensated. In other words, the variations in the least significant bits of the output signals from the D/A converters 19R, 19G, and 19B are canceled out. This maintains the black level of the camera signal components constant. Consequently, the brightness on the phosphor screen is prevented from flickering.

If this compensation is made for the durations of the reference pulses shown in FIG. 6(g), or during the vertical retrace interval, then the automatic cutoff operation itself would not be performed. Therefore, the compensation is not made for the durations of the reference pulses. That is, the switch circuit 34 is grounded for the periods of the reference pulses. The inverter 33 is connected into the circuitry for the duration of the camera signal components. In this way, the output signals from the D/A converters 19R, 19G, and 19B actually take the waveforms shown in FIG. 6(h).

Of course, if the above-described compensation is made by supplying the output signal from the inverter 33 to the grounded resistor $r_0$, the accuracy of 1 bit acting as the level shift control voltage is not affected. The output signals from the D/A converters which correspond to the least significant bits when the above-described compensation is not made are indicated by the dotted line in FIG. 7, while the output signals when the compensation is made are indicated by the solid lines.

(D) Color-Temperature Adjustment Outside Automatic Cutoff Loop

A switch circuit 22 shown in FIG. 1 is provided to adjust the color temperature. For this adjustment, the level shift circuits 12R, 12G, and 12B control a color-temperature adjustment voltage $V_3$ to vary the amounts of shifts of the DC components of the video signals. However, if this voltage $V_s$ is controlled for the durations of the reference pulses for controlling the automatic cutoff loop, then the heights of the reference pulses $RP_R$, $RP_G$, and $RP_B$ are varied, thus impeding normal operation of the automatic cutoff adjustment. Therefore, the switch circuit 22 is controlled so as to select a fixed voltage $V_4$ for the durations of the reference pulses.

Color-temperature adjustments made by the level shift circuits 12R, 12G, and 12B are described now. Even if the points at which red, green, and blue are emitted agree to some extent, color temperature adjustments are needed to homogenize the subtle shades of white by this CRT. For this purpose, in the prior art automatic cutoff adjustment system shown in FIG. 16, the reference voltage applied to the comparators 8R, 8G, and 8B for the three primary colors is set accurately. If the reference voltage is varied by controlling the value of $\Delta V_1$, the heights of the voltage pulses used to detect the cathode currents $R_{IK}$, $G_{IK}$, and $B_{IK}$ are changed by the cutoff-adjusting loop. This varies the heights of the reference pulses $RP_R$, $RP_G$, and $RP_B$ for the three primary colors. Since the black levels of the video signals are adjusted relative to the reference pulses $RP_R$, $RP_G$, and $R_{PB}$, the color temperature can be adjusted by setting the reference voltage. This reference voltage is controlled by a control signal supplied from a system control portion (not shown) via a bus.

Execution of the color-temperature adjustment within the cutoff adjustment loop is not adapted for the present embodiment, for the following reason. In the present embodiment, the heights of the reference pulses $RP_R$, $RP_G$, and $RP_B$ are controlled according to the output signals from the D/A converters 19R, 19G, and 19B. The bit resolution of these D/A converters is not always coincident with the resolution of the bus control signal for the color-temperature adjustment.

Figure 8:
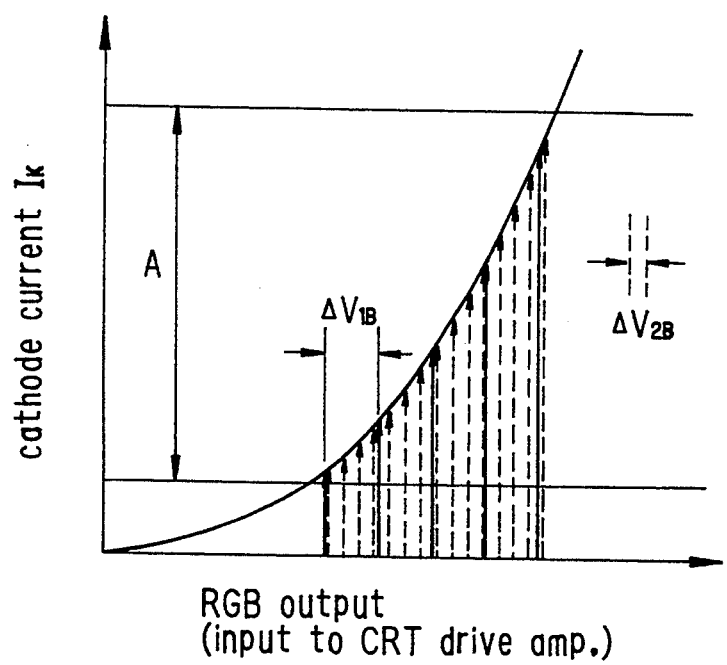
FIG. 8 is a diagram illustrating the accuracy of the bits of the control signal for color-temperature adjustment made in the display device shown in FIG. 1.

As an example, the relation of the cathode current of a CRT to the RGB output, i.e., the input to the drive amplifier for the CRT, is shown in FIG. 8. Let A be the dynamic range of the cathode current needed for automatic cutoff adjustment. Let $\Delta V_{1B}$ be the bit resolution (indicated by the solid lines) of the D/A converters 19R, 19G, and 19B. Let $\Delta V_{2B}$ be the resolution (indicated by the broken lines) of the bus control signal for the color-temperature adjustment. If color-temperature adjustment is ordered by the bus control signal, the adjustment of the black level of the video signal actually depends on the bit resolution of the D/A converters 19R, 19G, and 19B. Therefore, a dead zone is produced in making color-temperature adjustment. Hence, the accuracy is deteriorated.

Figure 9:
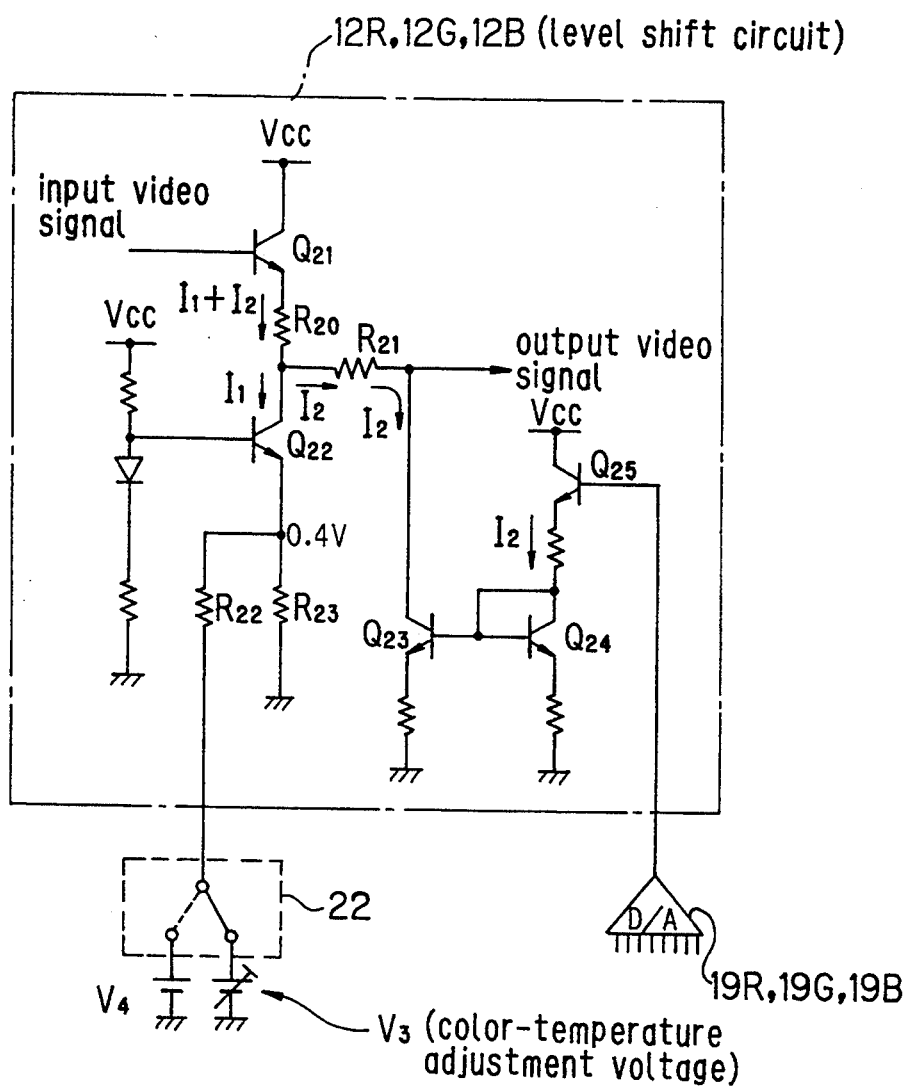
FIG. 9 is a circuit diagram of one of the level shift circuits of the display device shown in FIG. 1.

Accordingly, in the present embodiment, the color temperature is adjusted by the level shift circuits 12R, 12G, and 12B, using the color-temperature adjustment voltage $V_3$, outside the automatic cutoff adjustment loop. For example, these level shift circuits 12R, 12G, and 12B are constructed as shown in FIG. 9.

Figure 10:
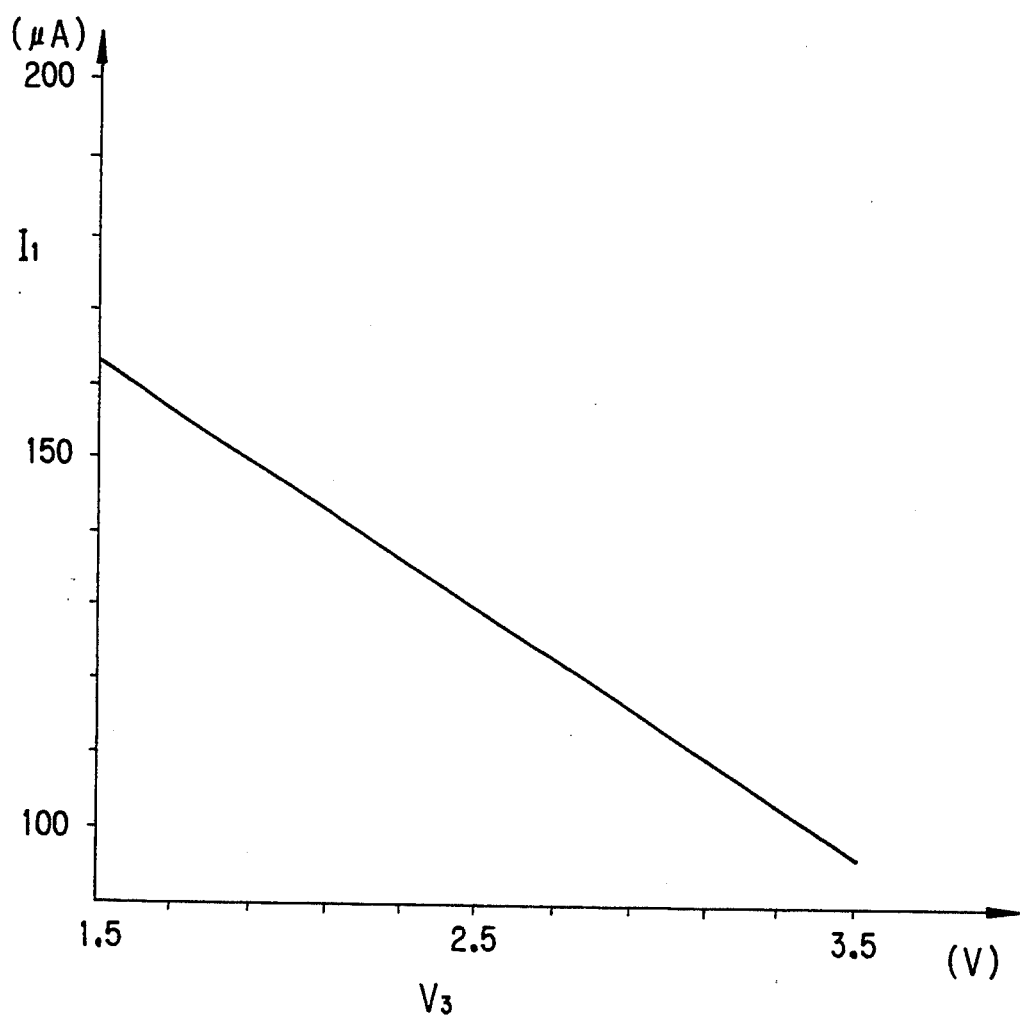
FIG. 10 is a graph illustrating an adjustment operation performed according to a color-temperature adjustment voltage in the display device shown in FIG. 1.

In each of these circuits, the R, G, or B video signal is applied to the base of a transistor $Q_{21}$. The video output signal is taken from the emitter of the transistor $Q_{21}$ via resistors $R_{20}$ and $R_{21}$. The control voltage for the automatic cutoff adjustment, i.e., the output from the D/A converter 19R, 19G, or 19B is applied to the base of a transistor $Q_{25}$ and converted into a current $I_2$. Since transistors $Q_{23}$ and $Q_{24}$ together form a current mirror circuit, the current $I_2$, flows into the resistors $R_{20}$ and $R_{21}$. On the other hand, a current $I_1$ depending on the color-temperature adjustment voltage $V_3$ or on the fixed voltage $V_4$ flows into the resistor $R_{20}$. These resistors $R_{20}$ and $R_{21}$ serve to shift the DC levels of the video signals. The amount by which the DC levels are shifted is determined by the currents flowing through the resistors $R_{20}$ and $R_{21}$. A transistor $Q_{22}$ whose base is grounded forms an amplifier. The emitter potential is about 0.4 V. Therefore, the value of the current $I_1$ is determined by the value of the color-temperature adjustment voltage $V_3$ and by the values of resistors $R_{22}$, $R_{28}$. In this case, the values of the resistors $R_{22}$, $R_{23}$ are fixed and so the value of the current $I_1$ is controlled by the value of the color-temperature adjustment voltage $V_3$. The values of the resistors $R_{22}$, $R_{23}$ are set to 30 k$\Omega$ and 2 k$\Omega$, respectively. Variations in the current $I_1$ caused when the color-temperature adjustment voltage $V_3$ is varied from 1.5 to 3.5 V are shown in FIG. 10. In this way, the color temperature can be adjusted by varying the current $I_1$ flowing through the resistor $R_{20}$. This adjustment of the current $I_1$, or the adjustment of the color-temperature adjustment voltage $V_3$, does not depend on the bit resolution of the D/A converters 19R, 19G, and 19B. Therefore, the accuracy of the color-temperature adjustment is not limited by the use of the D/A converters. Rather, the accuracy of the adjustment can be set at will according to the accuracy of the bus control signal.

In practice, the amounts by which the DC components are shifted, i.e., the amounts of shifts made by the level shift circuits 12R, 12G, and 12B, depend on the value of the current $I_2$ flowing through the resistors $R_{20}$ and $R_{21}$. That is, the video signals entered from the transistor $Q_{21}$ are reduced in level by the amount given by $$\{(I_1+I_2) \times R_{20} + I_2 \times R_{21}\}$$

before the video signals appear at the output.

In the present embodiment, the level shift circuits 12R, 12G, and 12B form two independent level shift control systems by means of the current $I_2$. determined by the automatic cutoff adjustment loop and the current $I_1$ determined by the color-temperature adjustment voltage $V_3$. Since the switch circuit 22 selects the fixed voltage $V_4$ for the durations of the reference pulses as mentioned above, the color-temperature adjustment does not impede the automatic cutoff adjustment.

(E) Quick Stabilization of Cutoff Adjustment, Using Counter Pulses

In the above embodiments, the reference pulses $RP_R$, $RP_G$, and $RP_B$ are added once per field. With respect to each one of the three primary colors, one voltage pulse is detected per field according to the cathode current detected, using the reference pulses, and applied to the comparator 17. The output signal from the comparator is counted once by the forward-backward counters 18R, 18G, and 18B per field. Consequently, the accuracy of the level shift operation for the cutoff adjustment is determined by the least significant bit of the D/A converter output.

In a practical CRT, it takes some time until the heater warms up and the emission of the beams from the electron guns stabilizes. During this time interval, the voltage pulses which are detected based on the reference pulses $RP_R$, $RP_G$, and $RP_B$ and correspond to the cathode currents frequently make large differences with the reference voltage ($V_1 + \Delta V_1$) supplied to the comparator 17. If the control is provided with such an accuracy that the amounts of shifts made by the reference pulses $RP_R$, $RP_G$, and $RP_B$ per field correspond to the least significant bits, then it takes considerable time for the system to settle down, i.e., until the CRT reaches the condition in which the forward-backward counters 31 are switched between forward counting and backward counting between successive fields.

In an ordinary television receiver, after the power supply is turned on, the video signals are blanked for some time, or for several seconds, to prevent the image from being displayed. If the blanking is terminated before the automatic cutoff adjustment operation stabilizes, then an abnormal image will be displayed. For this reason, the blanking is continued until the adjustment operation stabilizes. In particular, immediately after the power supply is turned on, no cathode currents flow. Therefore, the control signals obtained from the D/A converters increase the amounts of currents. Then, the level shift circuits increase the DC components of the video signals.

When the CRT warms up after some time and cathode currents flow, the DC components of the reference pulses and the DC components of the video signal output decrease and stabilize at some point. Normal display of image is not provided until this stable condition is obtained. The prolonged time required for the automatic cutoff adjustment operation to stabilize means that the visible image is produced after a long time. This is quite undesirable.

Therefore, where the above embodiment is adopted, it is desired that each forward-backward counter 31 perform a plurality of counting operations per field until the CRT stabilizes, whereby the automatic cutoff adjustment operation is quickly settled down to stable condition.

Figure 11:
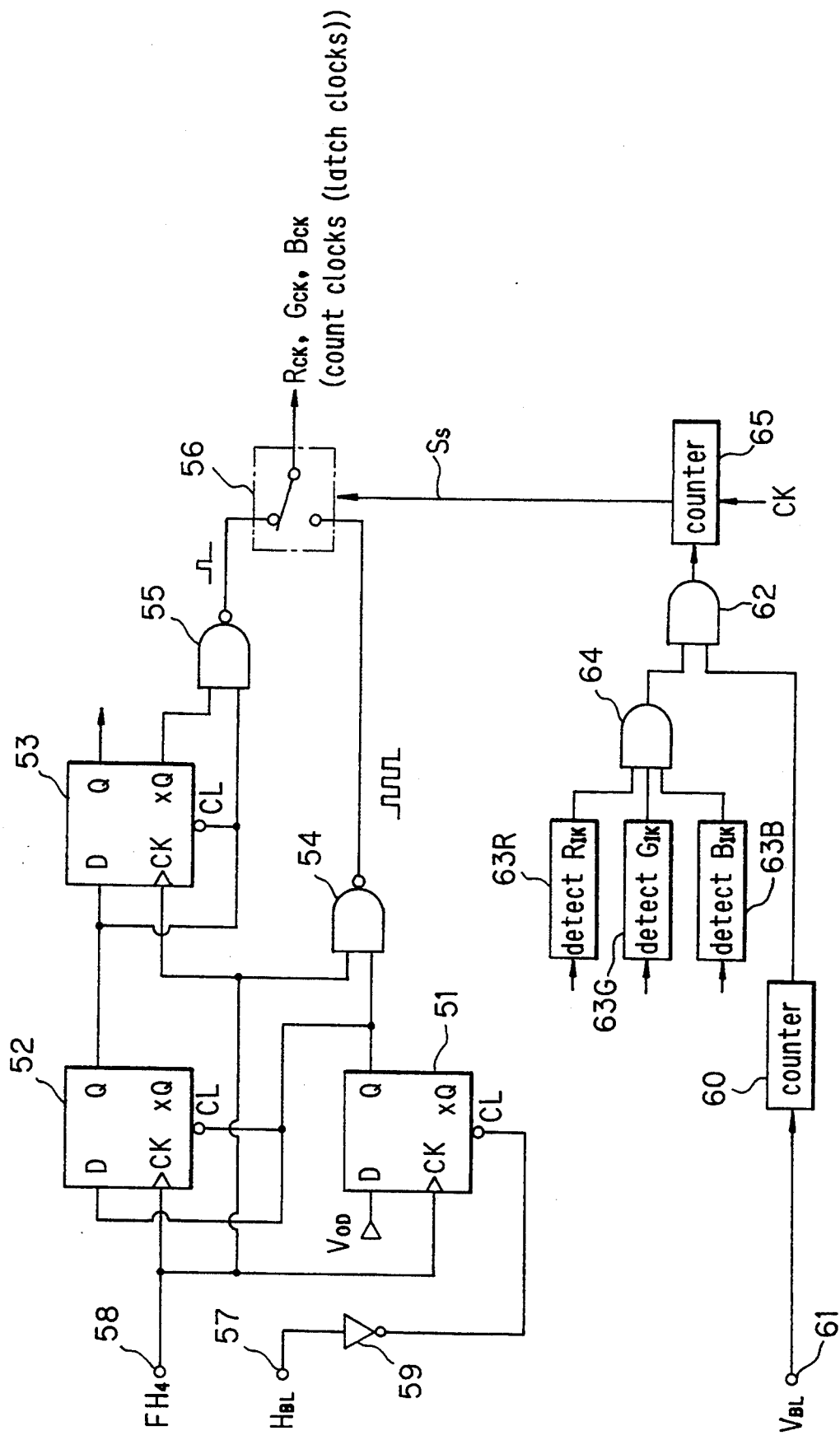
FIG. 11 is a block diagram of the count clock-generating portion of the display device shown in FIG. 1.
Figure 12:
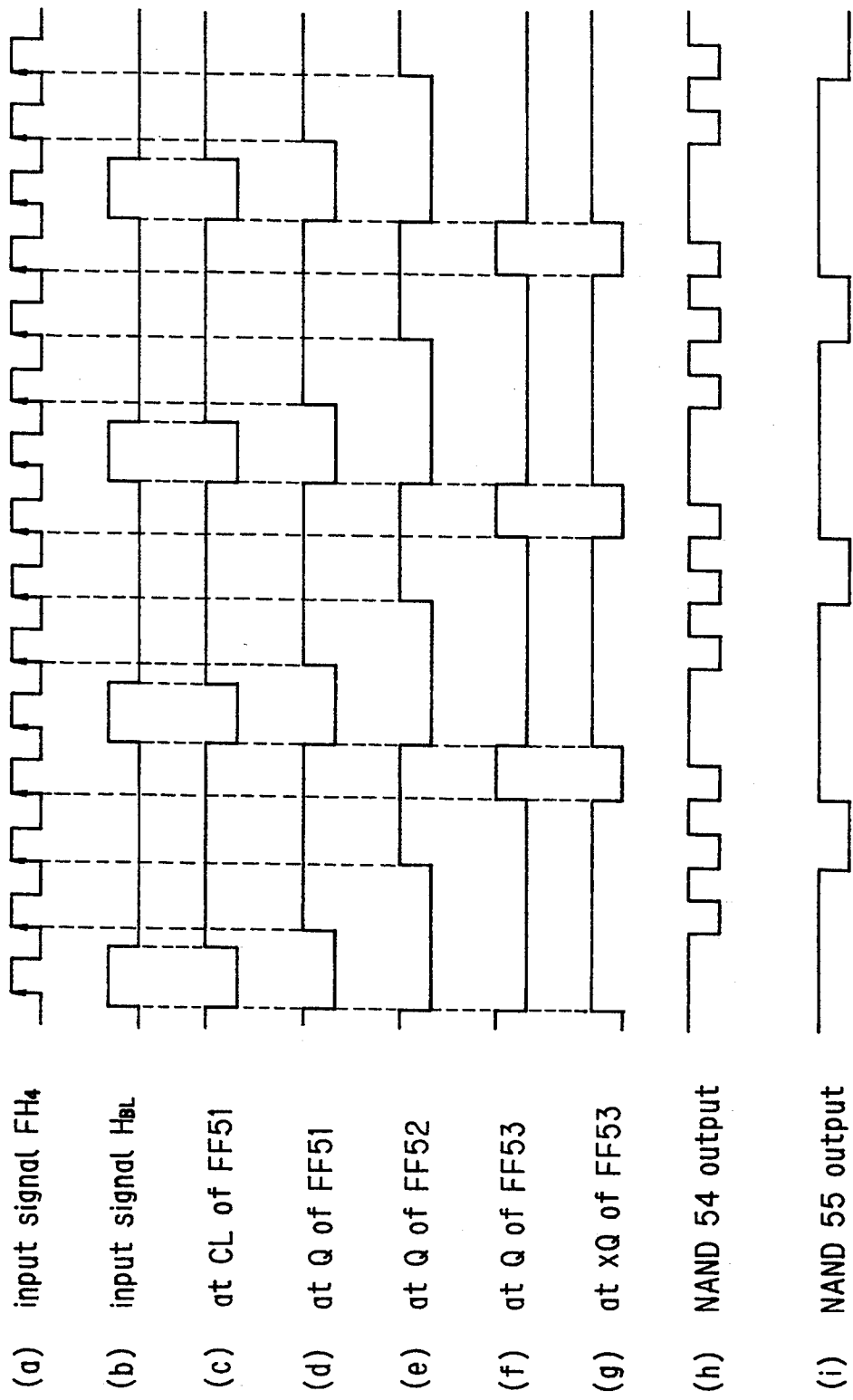
FIGS. 12(a)–12(i) is a waveform diagram illustrating an operation for producing count clocks in the display device shown in FIG. 1.
Figure 13:
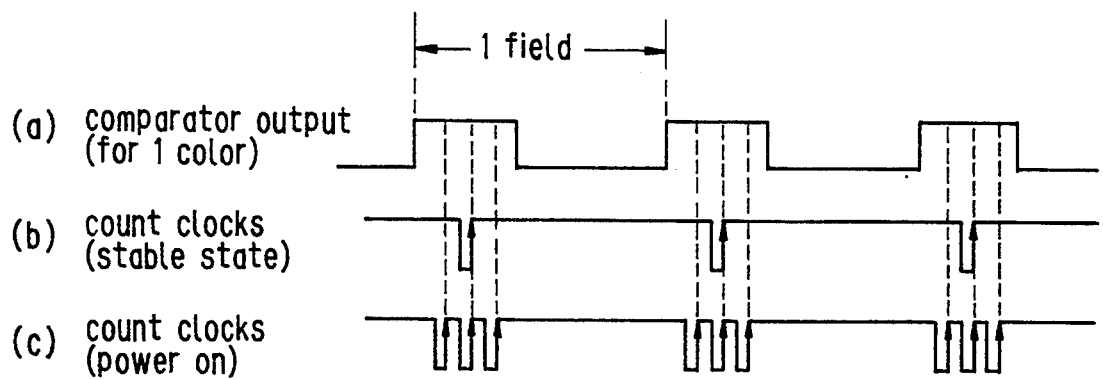
FIGS. 13(a)–13(c) are waveform diagrams illustrating a counting operation performed according to count clocks in the display device shown in FIG. 1.

A portion which produces the count clocks $R_{CK}$, $G_{CK}$, and $B_{CK}$ to the forward-backward counter portions 18R, 18G, and 18B is constructed as shown in FIG. 11. The input and output waveforms appearing at various portions of the circuit of FIG. 11 are shown in FIG. 12.

Referring to FIG. 11, the count clock-generating portion comprises D flip-flops 51, 52, 53, NAND gates 54, 55, a switch circuit 56, input terminals 57, 58. One pulse signal $H_{BL}$ (e.g., the horizontal sync signal or a signal created from the horizontal sync signal and having the same frequency as the horizontal sync signal) is applied to the input terminal 57 during one horizontal interval (see FIG. 12(b)). A signal $FH_4$ having a frequency four times as high as the frequency of the signal $H_{BL}$ is applied to the input terminal 58 (see FIG. 12 (a)).

The signal $H_{BL}$ is applied to the reset input terminal of the D flip-flop 51 via an inverter 59 (FIG. 11(c)). The signal $FH_4$ is supplied as latch clocks to the D flip-flops 51, 52, and 53 and also to the NAND gate 54. The Q output (FIG. 11(d)) from the D flip-flop 51 is supplied to the D flip-flop 52 and to the NAND gate 54. The Q output (FIG. 11 (e)) from the D flip-flop 52 is fed to the D flip-flop 53 and to the NAND gate 55. The xQ output (FIG. 11 (g)) from the D flip-flop 53 is fed to the NAND gate 55.

Therefore, the NAND gate 54 produces three clock pulses during one horizontal interval as shown in FIG. 11(h). The NAND gate 55 produces one clock pulse during one horizontal interval as shown in FIG. 11(i). Either the output from the NAND gate 54 or the output from the NAND gate 55 is selected by the switch circuit 56. The timing is done according to the reference pulses for the three primary colors. The selected signal is supplied as count clocks $R_{CK}$, $G_{CK}$, and $B_{CK}$ to the forward-backward counter portions 18R, 18G, and 18B.

With respect to each color, if the output signal from the comparator 17 applied to the forward-backward counter 18R, 18G, or 18B takes the waveform shown in FIG. 13(a), and if the output signal from the NAND gate 55 is selected, then count clocks shown in FIG. 13(b) are supplied. The result is that one counting operation is performed per field. If the output signal from the NAND gate 54 is selected, count clocks shown in FIG. 13(c) are supplied. At this time, three counting operations are performed per field.

That is, when the CRT is not yet stabilized, stabilization of the automatic cutoff adjustment operation is hastened by the use of the count clocks shown in FIG. 13(c).

Figure 14:
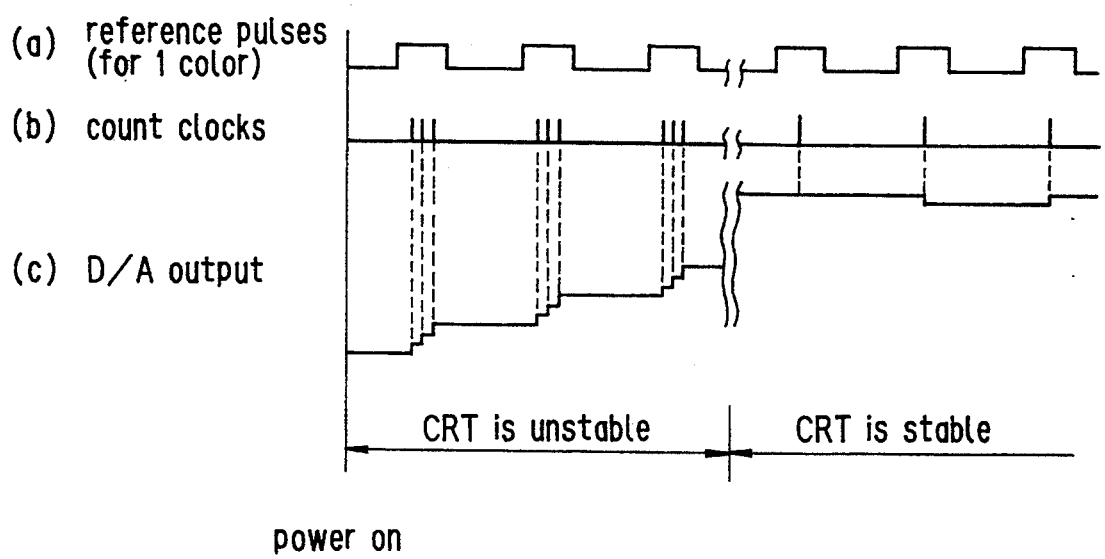
FIGS. 14(a)–14(c) are waveforms diagram of the output signals produced from the D/A converters of the display device shown in FIG. 1 in response to count clocks.
Figure 15:
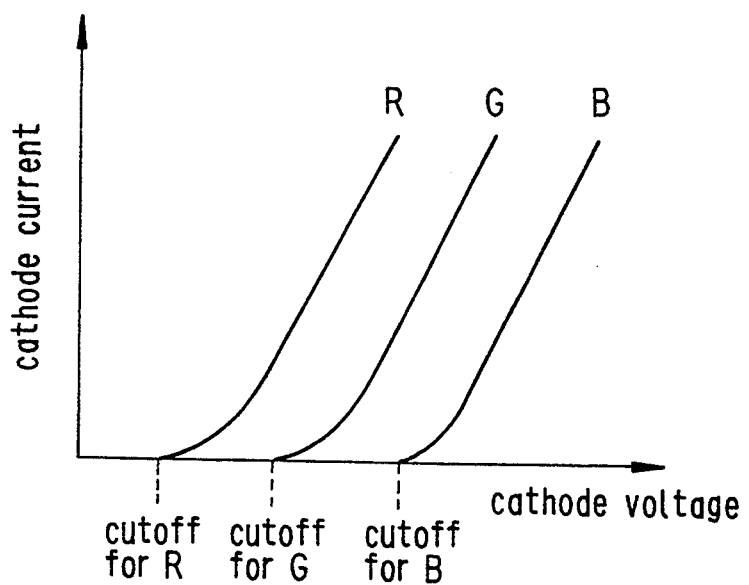
FIG. 15 is a graph showing the cutoff characteristics of phosphors emitting red, green, and blue colors.

FIG. 14, (a)-(c), respectively show the reference pulses the count clocks, and the output signal from any one of the D/A converters 19R, 19G, and 19B for one color where each forward-backward counter 31 performs three counting operations per field when the CRT does not yet stabilize immediately after the power supply is turned on and the counter 31 performs one counting operation after the CRT has stabilized. In this way, rapid stabilization can be accomplished by controlling the count clocks. Also, the blanking time immediately after the power supply is turned on can be shortened.

In the above embodiment, three count pulses are obtained during one horizontal interval under unstable condition. It is also possible to generate two, four, or more count pulses.

In this case, to obtain the timing at which the switch circuit 56 is switched to other state, a means for determining whether the operation of the CRT has stabilized or not is needed. To satisfy this requirement, in the circuit of FIG. 11, a counter portion 60 counts vertical blanking pulses supplied to an input terminal 61 up to a given number since the power supply has been turned on. Information about the total count is furnished to an AND gate 62. Furthermore, detector portions 63R, 63G, and 63B are provided to detect the presence or absence of the cathode currents $R_{IK}$, $G_{IK}$, and $B_{IK}$, respectively. Information indicating that cathode currents have been detected for all the three primary colors is sent out via an AND gate 64.

The values of the forward-backward counters 31 of the forward-backward counter portions 18R, 18G, and 18B shown in FIGS. 1 and 3 are reset to 0 at a given instant of time immediately after the power supply is turned on. Then, the forward-backward counters count in response to the voltage pulses created according to the cathode currents responsive to the reference pulses. For example, the counters count forward up to 3. In this way, the cathode currents are detected.

The AND gate 62 produces information indicating that the cathode currents have been detected when a given time passes since the power supply has been turned on. In response to this information, a counter 65 is started to count. When the counter 65 counts for a given time, e.g., 0.8 to 1 second, the CRT is judged to be in stable condition. The output signal from the counter 65 switches the switch circuit 56 to the side of the NAND gate 55 from the NAND gate 54.

In this case, stabilization of the operation of the CRT is detected at two stages, i.e., based on the detection of the cathode currents, (i.e., that the CRT has warmed up) and on the waiting time after the detection. Therefore, if the CRT has already warmed up as encountered when the power supply is turned on immediately after it is turned off, i.e., if the cathode currents are detected relatively quickly, the unwanted waiting time is eliminated. A decision to see if the CRT has been settled in stable operation can be quickly made. Conversely, where the CRT cannot be warmed up rapidly as encountered when air temperature is low, a sufficient waiting time can be secured by the detection of the cathode currents.

It is to be understood that the present invention is not limited to the embodiment described thus far and that various changes and modifications thereto are possible within the scope of the present invention.

As described thus far, in the novel display device, reference pulses are added to given locations within every field of video signals. The resulting cathode currents are converted into voltage pulses. Comparator means compare these voltage pulses with a given reference voltage. The cutoff characteristics of the CRT are controlled according to the output signals from the comparator means. The output signals from the comparator means are counted by forward-backward counter means and then converted into analog form by D/A converter means. Level shift means are provided which control the DC components of the video signals according to the output voltages from the D/A converter means. In this way, the cutoff characteristics are controlled. Therefore, the automatic cutoff loop can be formed within an IC. This dispenses with externally attached sample-and-hold capacitors. Hence, the number of components can be reduced. Also, the number of connecting pins of the IC can be reduced, thus resulting in a decrease in the cost. Furthermore, the efficiency of the manufacturing process can be improved. Additionally, even if the substrate ages, the automatic cutoff adjustment is prevented from operating unstably.

The reference voltage supplied to the comparator means is switched between first and second levels between successive fields. In stable state, each forward-backward counter is switched between forward counting and downward counting between successive fields. This stable operation can be carried out appropriately. Unstable operation of the automatic cutoff adjustment due to the effect of noise is prevented.

The variations in the least significant bits of the output signals from the D/A converter means are superimposed with opposite polarity on the output signals from the D/A converter means only for the durations of the camera signal portion of every field of the video signals. This prevents the brightness on the phosphor screen from flickering.

What is claimed is:

1. A display device having a CRT for displaying video signals organized into fields and having picture portions and retrace portions, said display device comprising:

means for adding reference pulses to said retrace portions within every field of said video signals, thereby producing cathode currents;

converter means for converting said cathode currents into voltage pulses;

a comparator which compares the voltage pulses with a given reference voltage;

a plurality of forward-backward counters which count the output signals from the comparator;

a plurality of D/A converters for respectively converting the output signals from the forward-backward counters into analog form; and a plurality of level shifters which control the DC components of the video signal according to the output voltages from the D/A converters, whereby the cutoff characteristics of the CRT are controlled.

2. The display device of claim 1 wherein when the CRT is in stable condition, the operation of each forward-backward counter is switched between forward counting and downward counting between successive ones of said fields, and said reference voltage applied to the comparator is switched between a first level and a second level between successive ones of said fields.

3. The display device of claim 1 wherein variations in the least significant bits of the output signals from the D/A converters are superimposed with opposite polarity on the output signals from the D/A converters only for the duration of the picture portion of every field of the video signals.

* * * * *